(No Model.)
A. L. MURPHY.
METHOD OF PREPARING TUBE SKELPS FOR HANDLING.
No. 376,780. Patented Jan. 24, 1888.
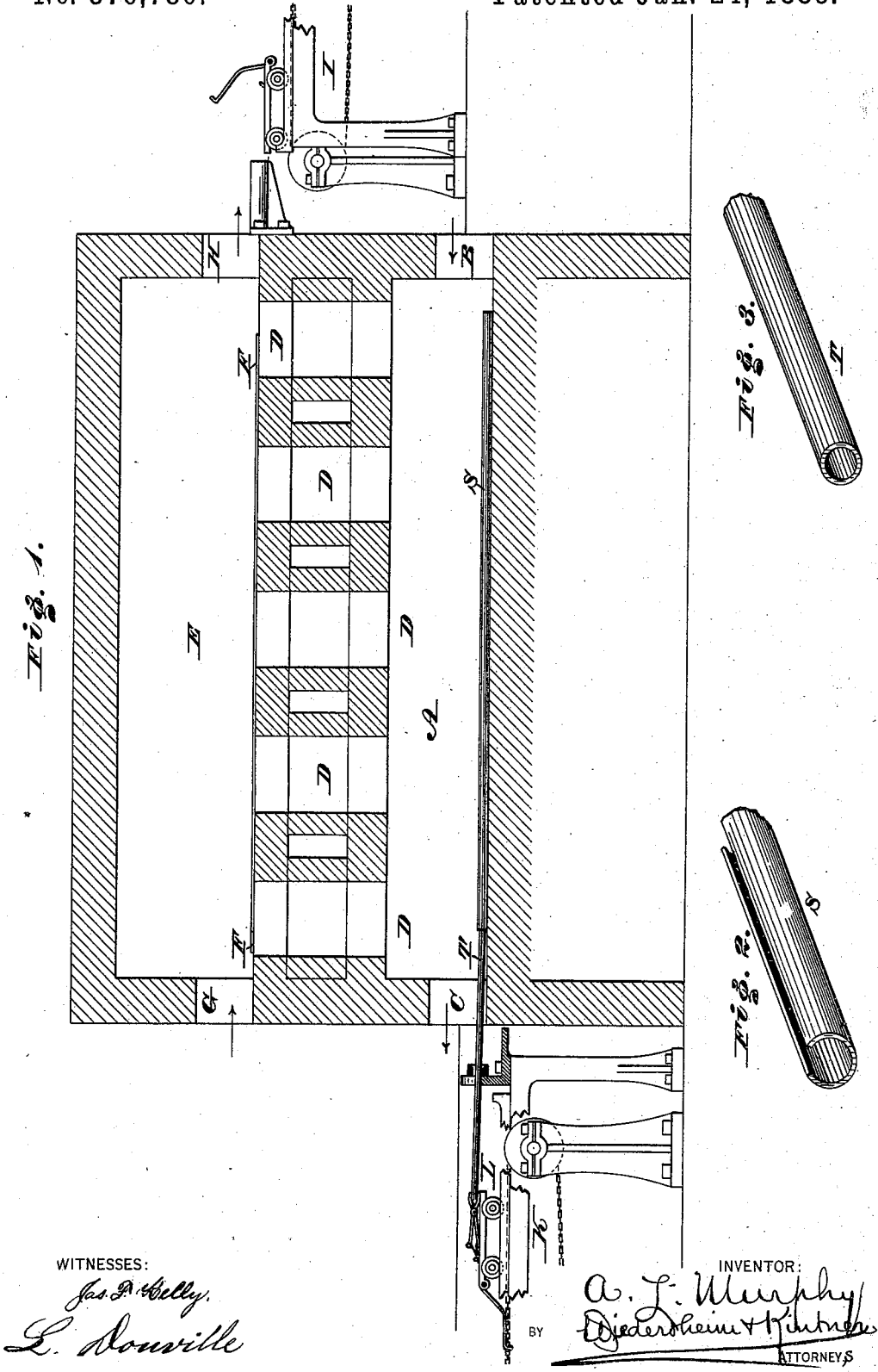
WITNESSES:
Jas. P. Kelly.
L. Douville
INVENTOR:
A. L. Murphy
BY Diederheim & Kintner
ATTORNEYS

United States Patent Office.

ALBERT L. MURPHY, OF PHILADELPHIA, PENNSYLVANIA, ASSIGNOR OF ONE-HALF TO JAWOOD LUKENS, OF CONSHOHOCKEN, PENNSYLVANIA, AND JOHN WALDRON, OF NEW BRUNSWICK, NEW JERSEY.

METHOD OF PREPARING TUBE-SKELPS FOR HANDLING.

SPECIFICATION forming part of Letters Patent No. 376,780, dated January 24, 1888.

Application filed June 23, 1887. Serial No. 242,254. (No model.)

*To all whom it may concern:*

Be it known that I, ALBERT L. MURPHY, a citizen of the United States, residing in the city and county of Philadelphia, State of Pennsylvania, have invented a new and useful Improvement in Butt-Welded Gas and Steam Pipes, which improvement is fully set forth in the following specification and accompanying drawings.

My invention relates to improvements in the manufacture of butt-welded wrought-iron pipes, and in a novel and improved method of drawing bent skelps when heated to welding heat, by attaching to the skelp while at such welding heat a tag, also heated at one end to welding heat, then drawing the skelp, and afterward removing the tag.

The object of my invention is to provide a cheap, simple, and effective means for withdrawing skelps in the process of welding; and to this end it consists in a novel method of drawing bent skelps from the welding-furnace when heated to a welding heat, by attaching to the skelp while thus heated a tag, usually hollow in form and heated at one end to a welding heat, thus uniting the skelp and tag, and then drawing the skelp, through the agency of the tag, from the furnace.

Figure 1 represents a furnace of well-known form for preparing and welding skelps. Fig. 2 represents a bent skelp; Fig. 3, my improved tag for attachment to the skelp.

Similar letters of reference indicate corresponding parts in the several figures.

Referring to the drawings, A represents the welding-furnace, having a charging-port, B, and an outlet or drawing port, C.

D D D are flues for conducting the surplus heat to the bending-furnace E, located above the welding-furnace, and in which are seen the flat sheets, F F, of metal being heated preparatory to bending them into skelps. This furnace has charging and drawing ports G and H and a draw-bench, I.

S represents the skelp, and K the draw-bench located beneath the draw-port.

The apparatus, being old, is only described here to better illustrate the application of my invention.

I will now describe my method of procedure. The bent skelp is placed in the welding-furnace, as shown, and heated to a welding heat. The tag T, located at one end, is inserted at the draw-port C a few inches into the end of the skelp. After a short time the two unite at welding heat, when the skelp is drawn in completed condition. The exterior end, L, of the tag, having been outside of the furnace, is sufficiently cool to enable it to be used as a handle for manipulating the skelp. The skelp and tag are then carried to the shears and cut apart. I make the tag hollow for the sake of lightness and economy of material, and utilize for such purpose old scraps or other cheap parts of iron.

Prior to my invention it was customary to handle bent skelps with tongs and analogous devices. Such apparatus are expensive, and owing to the intense heat of the furnace are soon destroyed and need repairing.

The apparatus I use is cheap, simple, and effective, and enables me to practice my novel method in such a manner as to avoid these objectionable features.

Having thus described my invention, what I claim as new, and desire to secure by Letters Patent, is—

1. The improved method or process of preparing skelps for handling in a welding-furnace, consisting in inserting into one end of a heated skelp a heated iron tag, whereby they are united, and then withdrawing the skelp by means of said tag, substantially as described.

2. The improved method of preparing skelps for handling in a welding-furnace, consisting in heating the skelp to a welding heat and inserting thereto one end of a handling-tag heated to a similar temperature, thereby connecting them, so that the skelp may be handled by said tag, substantially as described.

ALBERT L. MURPHY.

Witnesses:
JOHN A. WIEDERSHEIM,
JAS. F. KELLY.